Morcerf et al.

[11] Patent Number: 4,491,966
[45] Date of Patent: Jan. 1, 1985

[54] MARITIME TELECOMMUNICATIONS SYSTEM

[75] Inventors: Lester A. Morcerf; Charles E. Kiefer, both of Plano; Gary W. Jones, Garland; John E. Conditt, Richardson, all of Tex.

[73] Assignee: Rockwell International Corporation, El Segundo, Calif.

[21] Appl. No.: 403,225

[22] Filed: Jul. 29, 1982

[51] Int. Cl.³ .......................... H04B 7/00; H04Q 7/00
[52] U.S. Cl. .......................................... 455/32; 455/49; 455/77; 455/73; 340/825.54
[58] Field of Search ................. 455/32, 49, 53, 58, 455/73, 77; 340/825.5, 825.51, 825.54

[56] References Cited

U.S. PATENT DOCUMENTS

| | | | |
|---|---|---|---|
| 3,701,945 | 10/1972 | Gallant et al. | 455/77 |
| 4,186,342 | 1/1980 | Kyle | 455/77 |
| 4,267,597 | 5/1981 | Volpi et al. | 455/77 |
| 4,276,653 | 6/1981 | Aarsen et al. | 455/49 |

*Primary Examiner*—Jin F. Ng
*Attorney, Agent, or Firm*—Richard A. Bachand; V. Lawrence Sewell; H. Fredrick Hamann

[57] ABSTRACT

A radio system for automated ship board operation includes a plurality of radio receivers and a plurality of radio transmitters. The system includes an ARQ unit, with which one of the receivers and one of the transmitters is associated. A DSELCALL unit is provided, with which another one of the receivers and another one of the transmitters is associated. A VDT unit is provide upon which radio information and messages can be displayed upon reception and composed for transmission. The system includes a computer control which is automatically responsive to control instructions entered into the VDT for selectively associating the receivers and transmitters with the DSELCALL unit and the ARQ unit in accordance with the control instructions, scanning the receiver associated with the DSELCALL unit among preselected DSELCALL frequencies, controlling the transmitter associated with the DSELCALL unit in accordance with the frequency of the scanned receiver, and controlling the operation of the receivers and transmitters associated with the ARQ unit as needed.

9 Claims, 9 Drawing Figures

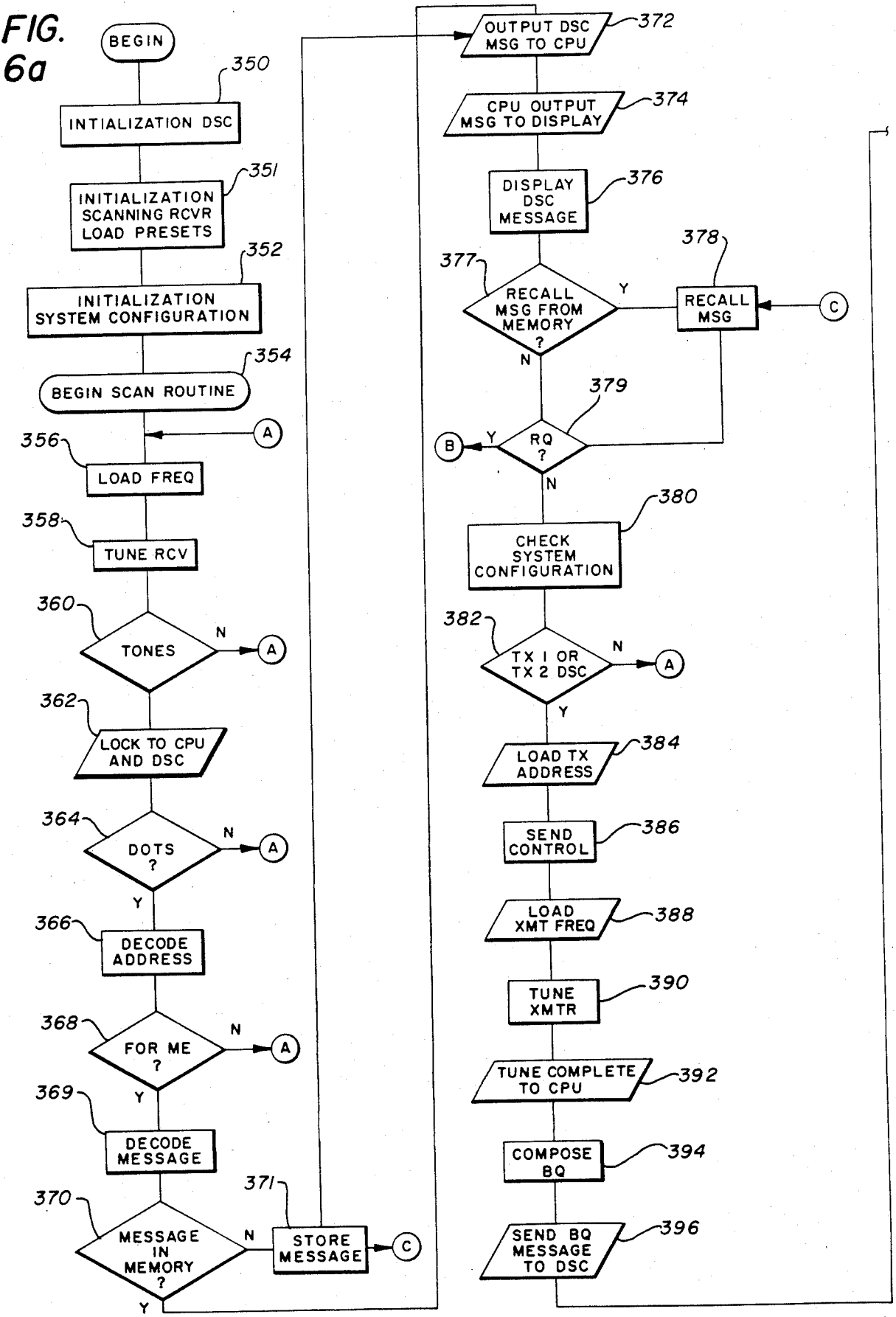

MARITIME TELECOMMUNICATIONS SYSTEM

BACKGROUND OF THE INVENTION

1. Field of the Invention

This invention relates to improvements in radio control systems, and more particularly to a control system of the type which facilitates timely reliable communications intership or between the ship and the harbor/shore facilities, and which facilitates intraship communications, as well.

2. Description of the Prior Art

Shipboard telecommunications is in an increasing state of development especially in view of the widespread availability and usage of digital electronics. One of the problems encountered in shipboard communications is the extremely hostile environment in which high frequency communications are conducted. The metal ship hull and structures act as reflectors to the signals, exaccerbating an already difficult communication situation. Not uncommonly, for example, even today ships at sea have periods of from several hours to days during which communications, if possible at all, are by way of CW Morse code. Thus, there have been many proposals for equipment to enable more reliable communications. One proposal is for so called automatic error request (ARQ) operations, in which a teletype over radio signal is transmitted, and as it is received, confirming signals are returned. Thus, whether or not the message has been received is known to the transmitting station.

Another system which has been receiving recent attention is selective calling techniques, especially such techniques which can be digitally implemented. Typically, a digital selective calling (DSELCALL) operation is as follows. A message is constructed having certain portions formatted in accordance with predefined codes. The first portion of the sequence presents a format specifier, such as a distress call, an all ships call, or the like. The second portion is the address of a ship or class of ships to which the message is intended. The third portion indicates the priority of the message, such as urgent, routine, safety, etc. The fourth portion is the identification of the sending station, and the fifth portion includes the messages or messages to be transmitted. The total length of the message may be of predefined length, for instance, of up to 90 characters, and may typically contain information regarding the type of distress, if a distress message is involved, for example, or other information, as needed. In addition, the message may be directive; for instance, the message may request the receiving station to receive an extended message from the transmitting station on another frequency, for example, by teletype over radio. In such case, the message may set forth frequencies on which the teletype message will be sent. When such a message is received, the radio operator will configure a receiver and transmitter to operate on the specified frequencies. Usually, an ARQ unit is associated with such teletype operations, so that as the teletype message is being transmitted and received, confirmation signals are being transmitted to insure correct reception of the signal.

Because of the increasing telecommunication needs of commercial ships, increasing numbers of radio equipment and the like are being installed on ships. Usually, for example, there are one or more high frequency transmitters and receivers, as well as one or more very high frequency transmitters and receivers. There are many subuses for the equipment, such as providing telephone patch service for the people on board, providing telegraph service, providing teletype service and receiving weather and other information, and providing other communications pertaining to the ship's operation and business.

In addition to communication requirements to locations outside the ship, included in the radio specifications of most ships, are certain sensor functions. For example, most ships include sensors for indicating the ship's speed, heading and position, as well as the state of the sea, the winds, the weather, and so forth. Often, it is desired to communicate this information to other locations, such as nearby ships, or to land based "home" stations.

Of particular interest to shipboard personnel is the effective signalling of alarms. Some alarms typically used are distress, distress relay, vital safety, urgent messages, important safety, routine business, routine, VHF selective ringer and so forth. It can be seen that depending upon the alarm, it may be desired that selected ones of the alarms be sounded or displayed, or not sounded or displayed, in certain areas, such as officer's quarters, the wheelhouse, the radio officer's quarters, as necessary. In addition, some alarms may need to be broadcast or rebroadcast (if, for example, the alarm is a distress call received from another ship which requires the alarm to be rebroadcast), to nearby ships or land stations, as required.

Typically, shipboard radio and electronic apparatuses are operated and maintained by a radio officer. Usually, the radio officer is charged with the duty to operate the equipment during normal hours and with the duties to maintain and repair the equipment during overtime or non-working hours. This schedule may be particularly expensive to the ship owners, especially if significant overtime is needed.

It is therefore desirable to provide a system by which the ship's radio and electronic equipment can be operated in a non-attended manner, or in a manner requiring minimum attention of the ship's personnel. However, as set forth above, the system must also be capable of making decisions, for instance, to rebroadcast alarms, to direct alarms to preselected shipboard locations, to receive certain communications for later review or dissemination, and the like.

BRIEF DESCRIPTION OF THE INVENTION

In light of the above, it is, therefore, an object of the invention to provide a radio telecommunications system for maritime use.

It is another object of the invention to provide a radio telecommunications system of the type described the operation of which can be managed by a central processing unit or a programmed microcomputer or microprocessor.

It is another object of the invention to provide a radio telecommunications system of the type described which provides microprocessor control of HF radiotelephone; VHF FM radiotelephone; HF radiotelegraph, including CW, simplex TTY over radio, automatic error request, forward error control, and digital selective calling; and HF special meteorological data reception.

It is another object of the invention to provide a maritime radio telecommunications system of the type described which can additionally manage the ship's alarm functions.

It is another object of the invention to provide a maritime radio telecommunications system which can be operated in an unattended manner, or in a manner which requires minimum operator attention.

It is another object of the invention to provide a radio telecommunications system with which remote communications can be had during unattended operation.

It is another object of the invention to provide a radio telecommunications system which can be addressed and operated from a remote location.

These and other objects, features and advantages will become apparent to those skilled in the art from the following detailed description when read in conjunction with the accompanying drawings and appended claims.

In accordance with a broad aspect of the invention, a radio system for automated ship board operation includes a plurality of radio receivers and a plurality of radio transmitters. An ARQ unit is provided with which one of the receivers and one of the transmitters is associated. A DSELCALL unit is provided with which another one of the receivers and another one of the transmitters is associated. A VDT unit is provide upon which radio information and messages can be displayed upon reception and composed for transmission. Means also are provided which are automatically responsive to control instructions entered into the VDT for configuring the plurality of transmitters and receivers, and includes selectively associating the receivers and transmitters with the DSELCALL unit and the ARQ unit in accordance with the control instructions, scanning the receiver associated with the DSELCALL unit among preselected DSELCALL frequencies, and controlling the transmitter associated with the DSELCALL unit in accordance with the frequency of the scanned receiver, and controlling the operation of the receivers and transmitters associated with ARQ unit as needed.

BRIEF DESCRIPTION OF THE DRAWING

The invention is illustrated in the accompanying drawing in which:

And FIGS. 6a and 6b are flow charts of a preferred computer program for operation of the central processing unit of the radio telecommunications system in accordance with the invention for automatically operating the system.

In the various figures of the drawing, like reference numerals are used to denote like parts. In addition, various sizes and dimensions of the parts have been exaggerated or distorted for ease of description and clarity of illustration.

DETAILED DESCRIPTION OF THE PREFERRED EMBODIMENTS

Figure 1:
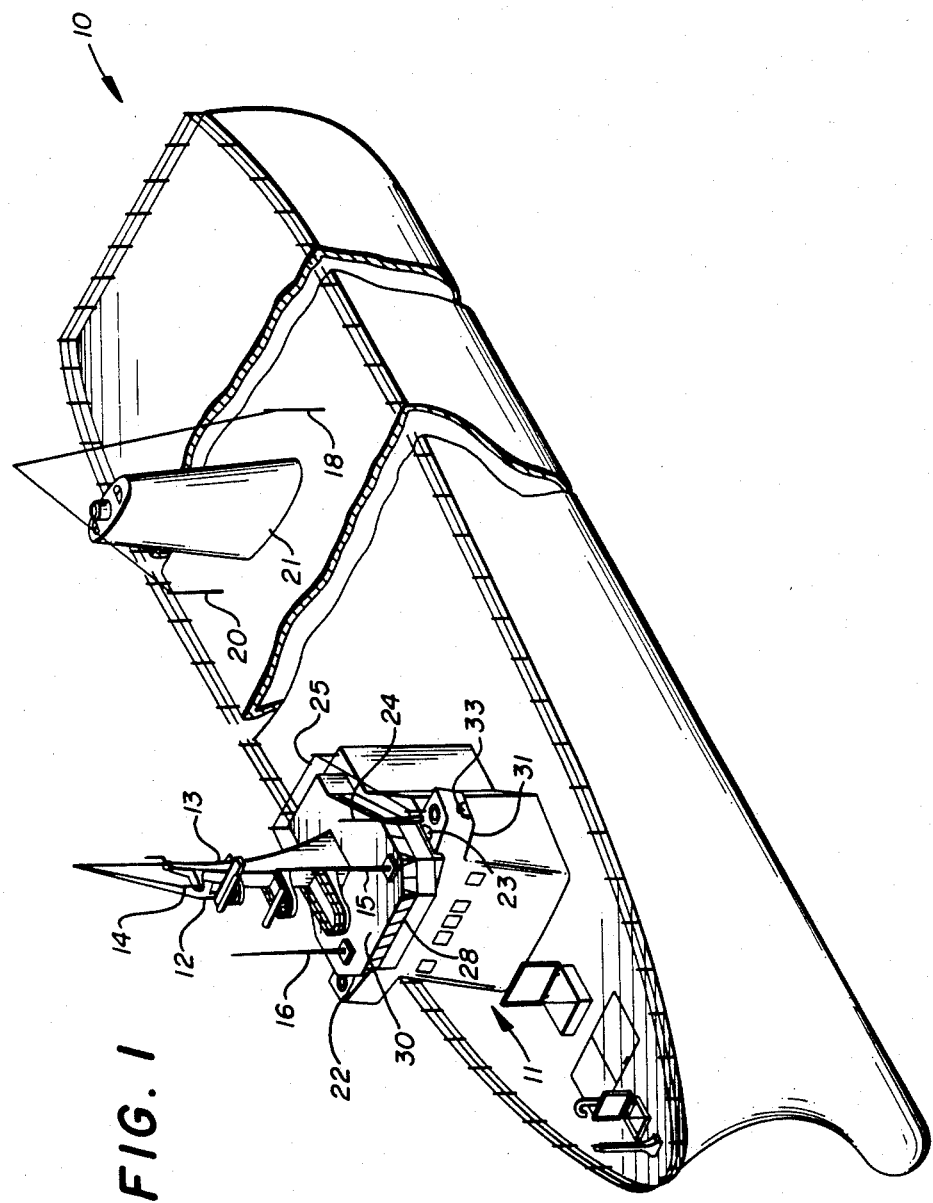
FIG. 1 is a perspective view of a ship on which a radio telecommunications system in accordance with the invention is installed, illustrating, in particular, a preferred placement of various antennas used in conjunction with the radio telecommunications system.

The radio telecommunications system of the invention is intended for maritime use, and can be installed on an ocean going vessel, such as the ship 10, shown in FIG. 1. Externally mounted on the ship 10 are the various antennas, at various locations as is next described in detail.

Two VHF antennas 12 and 13 are located near the top of the mast of the bridge 11. Two HF transmit antennas 15 and 16 are mounted on the port and starboard sides of the bridge 11, and two VHF receive antennas 18 and 20 are located amidship on the deck on each side of the stack 21. Additionally, on each wing of the bridge 11, handset/speakers 22 and 23 are respectively located. An MF antenna 24 is mounted on the port side of the bridge, and a reserve MF antenna, 25 extends around the after section of the bridge.

Other parts of the radio telecommunications system in accordance with the invention are mounted at various selected locations of the ship. For example, the bridge-to-bridge VHF radio and VHF monitors (not shown) can be placed at the conning console wheelhouse 28. Extension indicators (not shown) can be located at the watch standers console wheelhouse 30, as well as in the radio officer's quarters 31. The main VHF radio control (not shown) also can be located at the conning console wheelhouse 28. Finally, the teletypewriter (not shown) can be located in the purser's office 33.

It should be noted that the placement of the various antennas and equipment is intended to be exemplary of a typical installation, and that other configurations may also be equally advantageously employed, as will be apparent to those skilled in the art.

Figure 2:
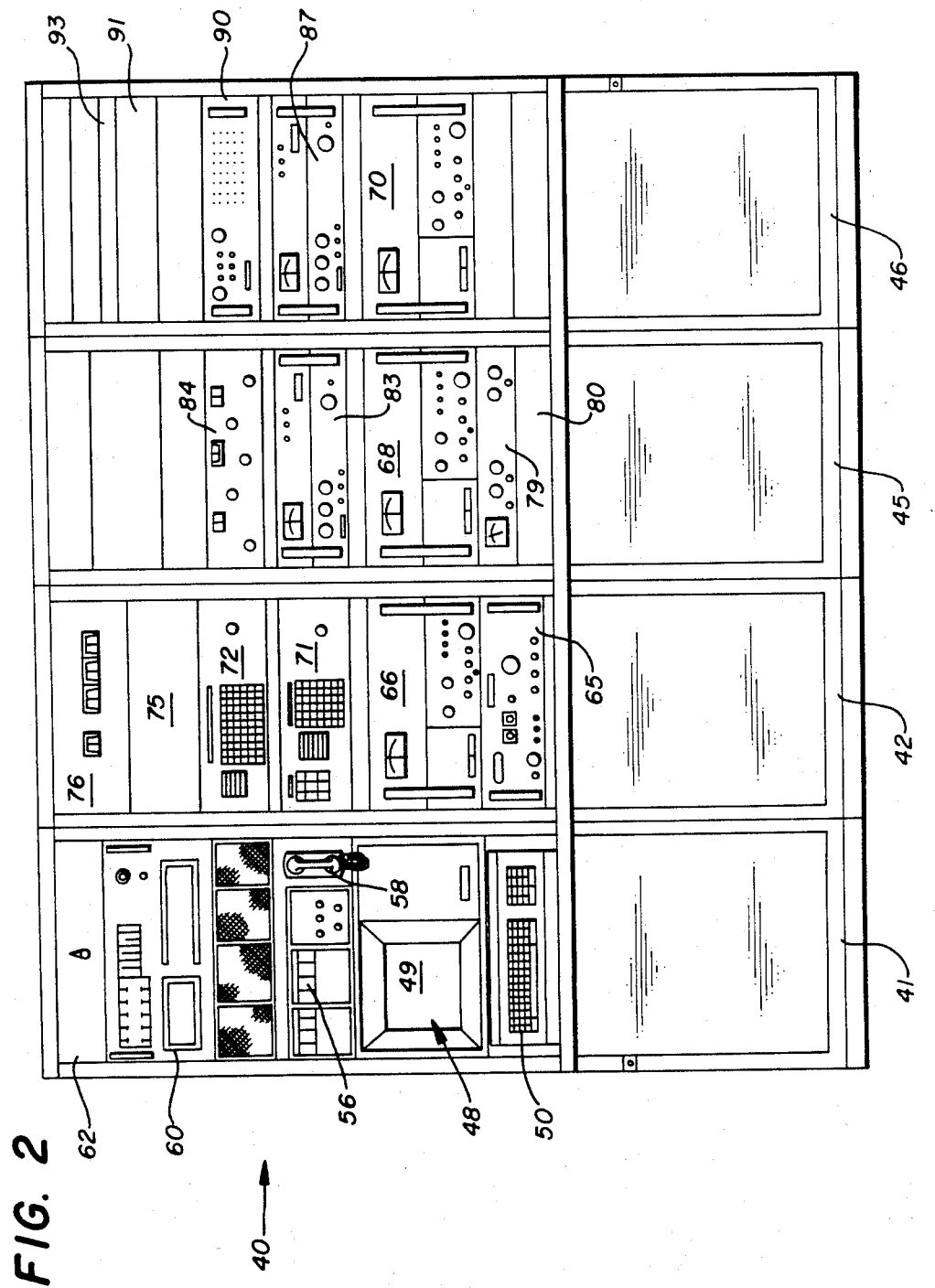
FIG. 2 is a front view of a preferred configuration of a radio telecommunications system, in accordance with the invention.

A preferred arrangement for the radio telecommunications system components within the ship is shown in FIG. 2, and is denoted by the general reference numeral 40. The radio telecommunications system is mounted in four adjacent equipment racks 41, 42, 45, and 46, which can be installed, for example, in a ship's radio room, or other convenient location, not shown. The system 40 includes the following equipment in the first rack 41: a VDU (video display unit) 48, for human interface, including a video display screen 49 and operator keyboard 50. Mounted in the rack 41 above the VDU 48 is a control panel 56 for two VHF FM transceivers (not shown) carried directly behind the control panel 56. The VHF transceivers are used for communications to the bridge, for bridge to bridge communications, ship's primary communications, phone patch, distress and vessel traffic channel monitoring and scan lock frequency monitoring for the selective ringing alert tones. Carried upon the panel 56 is a telephone handset 58 for use in the above described communications. Mounted above the VHF radio control panel 56 is a central processor 60, which, in essence, controls the various equipments comprising the radio telecommunications system in accordance with the invention as will become apparent from the discussion below. Finally, above the central processor 60 is a VHF scan control and the main VHF power transceiver panel 62.

The second rack 42 includes the operator control panel 65, from which, in conjunction with the VDU keyboard, the entire radio telecommunications system 40 can be operated, for example, in the specification of frequencies of the transmitters and receivers, the selection of locations on board the ship at which various inputs and outputs are directed, and, in general, in any aspect of the radio telecommunications system which can be controlled by the operator.

Above the operator control panel 65 in the second rack 42 is a high frequency receiver 66, which can conveniently be a HF receiver sold by Rockwell International Corporation identified as a Collins 851S-1 HF Receiver. As will become apparent from the following description, the HF receiver 66 is one of three such units, the other two 68 and 70 being emplaced in similar locations in racks 45 and 46, respectively.

Above the HF receiver 66 in the second rack 42 is an audio matrix 71, which serves to route the transmitting and receiving audio signals among the various equipments of the radio telecommunications system in accordance with the invention, and the operation of which is described in detail below with reference to FIG. 5. Above the audio matrix 71 is a receive antenna matrix 72, described in detail below with respect to FIG. 4.

A distress frequency watch receiver 75 is located above the receive antenna matrix 72 in the second rack 42, and, finally, the main power panel 76 is installed in the uppermost location.

In the third rack 45, immediately below the HF receiver 68, is the phone patch 79 and transceiver relay 80. Above the HF receiver 68 is a high frequency exciter 83 for one of the two HF transmitters. To complete the front panel of the rack 45 is a receiver multicoupler and filter 84.

In the fourth rack 46, as mentioned above, is the third HF receiver 70. Above the HF receiver 70 is a second high frequency exciter 87. The high frequency exciters 83 and 87 are connected to respective power amplifiers to transmit onto respective antennas 15 and 16 on the ship's bridge (see FIG. 1).

Above the HF exciter 87 in the fourth rack 46 is an ARQ terminal 90, and immediately above the ARQ terminal 90 is the digital selcall unit 91. Immediately above the digital scall unit 91 is an HF scan tone detector 93, which operates in conjunction with the HF receivers 66, 68, and 70, under the control of the central processor 60.

Figure 3:
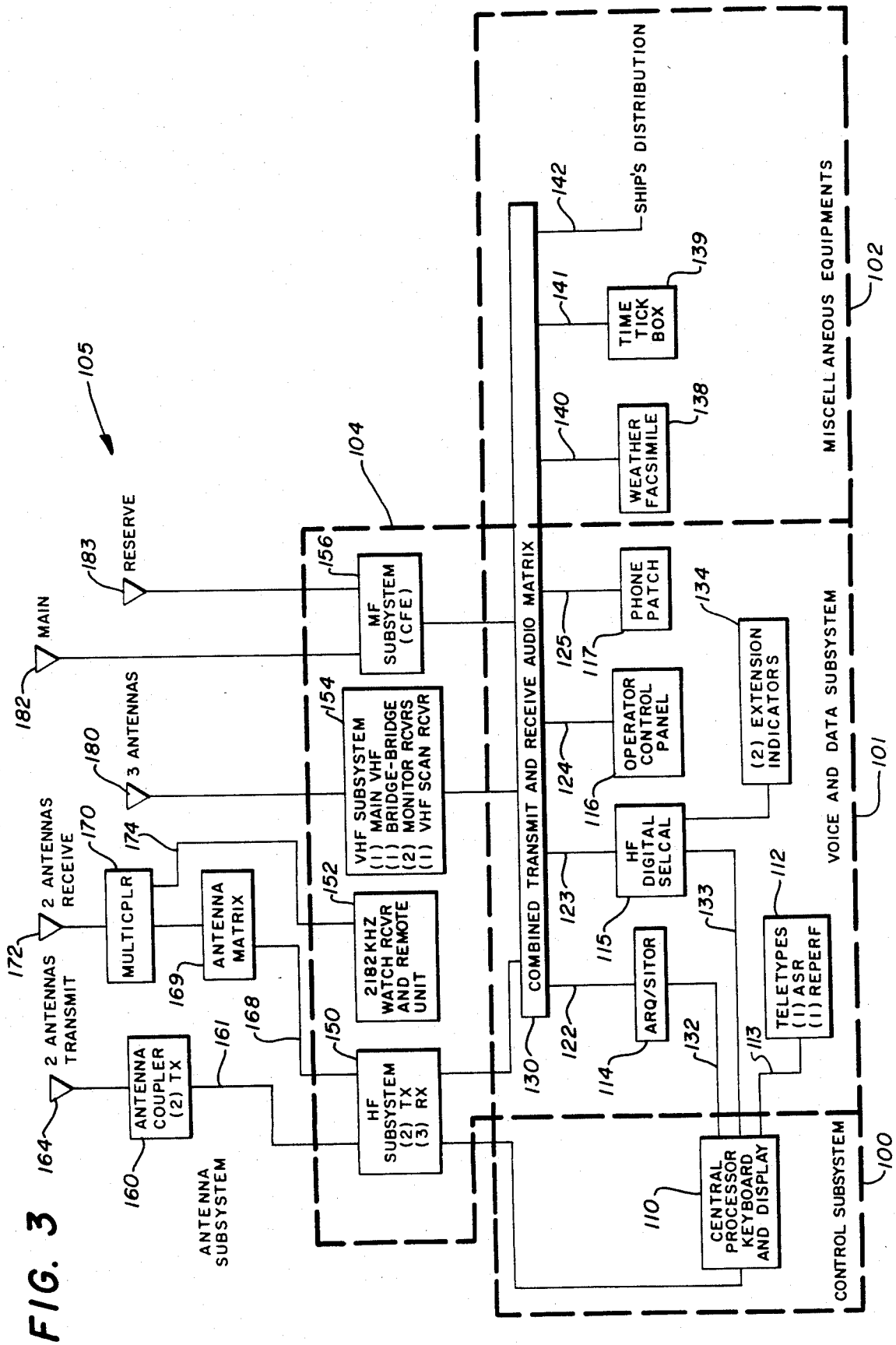
FIG. 3 is a box diagram of the radio telecommunications system of FIGS. 1 and 2, in accordance with the invention.

The system described above with reference to FIGS. 1 and 2 is shown in block diagram form in FIG. 3. As illustrated, the system includes five main sections, each encircled by dashed lines: the control subsystem 100, the voice and data subsystem 101, miscellaneous equipment 102, radio transmitter and receiver subsystems 104, and various antenna arrays 105. (Power subsystems are additionally included, but are not shown for clarity.)

Each of the subsystems is configured as presently described. The control subsystem 100 includes the central processor keyboard and display 110. The voice and data subsystems include teletypes 112, including an ASR and an REPERF teletype system, both controlled via line 113 from the central processor keyboard and display 110. An ARQ/SITOR unit 114, a high frequency digital selective callin9 (DSELCALL) unit 115, an operator control panel 116, and a phone patch unit 117, are also provided with output lines 122-125 respectively connected to a combined transmit and receive audio matrix 130. The ARQ/SITOR unit 114 is connected by a line 132 to the central processor keyboard and display 110, and, in similar fashion, the HF digital selcall unit is connected by a line 133 to the central processor keyboard and display 110. The HF digital selcall unit 115 additionally includes two extension indicators 134, described further below. The miscellaneous equipment subsystem 102 includes a weather facsimile unit 138 and a time tic box 139, connected by respective lines 140 and 141 to the combined transmit and receive audio matrix 130. Additionally, ship distribution lines 142 are provided within the miscellaneous equipment subsystem 102 to the combined transmit and receive audio matrix 130.

The transmitter and receiver subsystem unit 104 includes a high frequency subsystem 150 which includes two high frequency transmitters and three high frequency receivers. A 2182 kilohertz watch receiver and remote unit 152 is provided, as well as a VHF subsystem 154 including a main VHF radio, a bridge-to-bridge radio, two monitor receivers, and a VHF scanning receiver. A medium frequency (MF) subsystem 156 is also provided within the receiver and transmitter subsystem 104.

Finally, in the antenna array 105, two transmitter antenna couplers 160 are connected to the transmitters of the high frequency subsystem 150 by line 161, each couples the output of a respective HF transmitter to a selected transmitter antenna, (both antennas being indicated by the single antenna symbol 164). The two antennas 164 correspond to the high frequency transmit antennas on the bridge, indicated by reference numerals 15 and 16 in FIG. 1. The receivers of the high frequency subsystem 150 are connected by line 168 through an antenna matrix 169 to a multicoupler 170, each to a respective one of the two receiver antennas indicated by the symbol 172. The two antennas indicated by the symbol 172 are identified as the high frequency receiver antennas 18 and 20 in the midship portion of the ship 10 shown in FIG. 1. Additionally connected to the multicoupler 170 via line 174 is the 2182 kilohertz watch receiver and remote unit 152.

The radios of the VHF subsystem in unit 154 are connected directly to respective selected VHF antennas indicated by the symbol 180. The VHF antennas 180 are shown by antennas 12, 13 and 14 on the mast of the ship 10 in FIG. 1.

Finally, the medium frequency subsystem is connected directly to a main antenna 182 and a reserve antenna 183, corresponding to medium frequency antennas 24 and 25, respectively, on the ship 10 in FIG. 1.

Figure 4A:
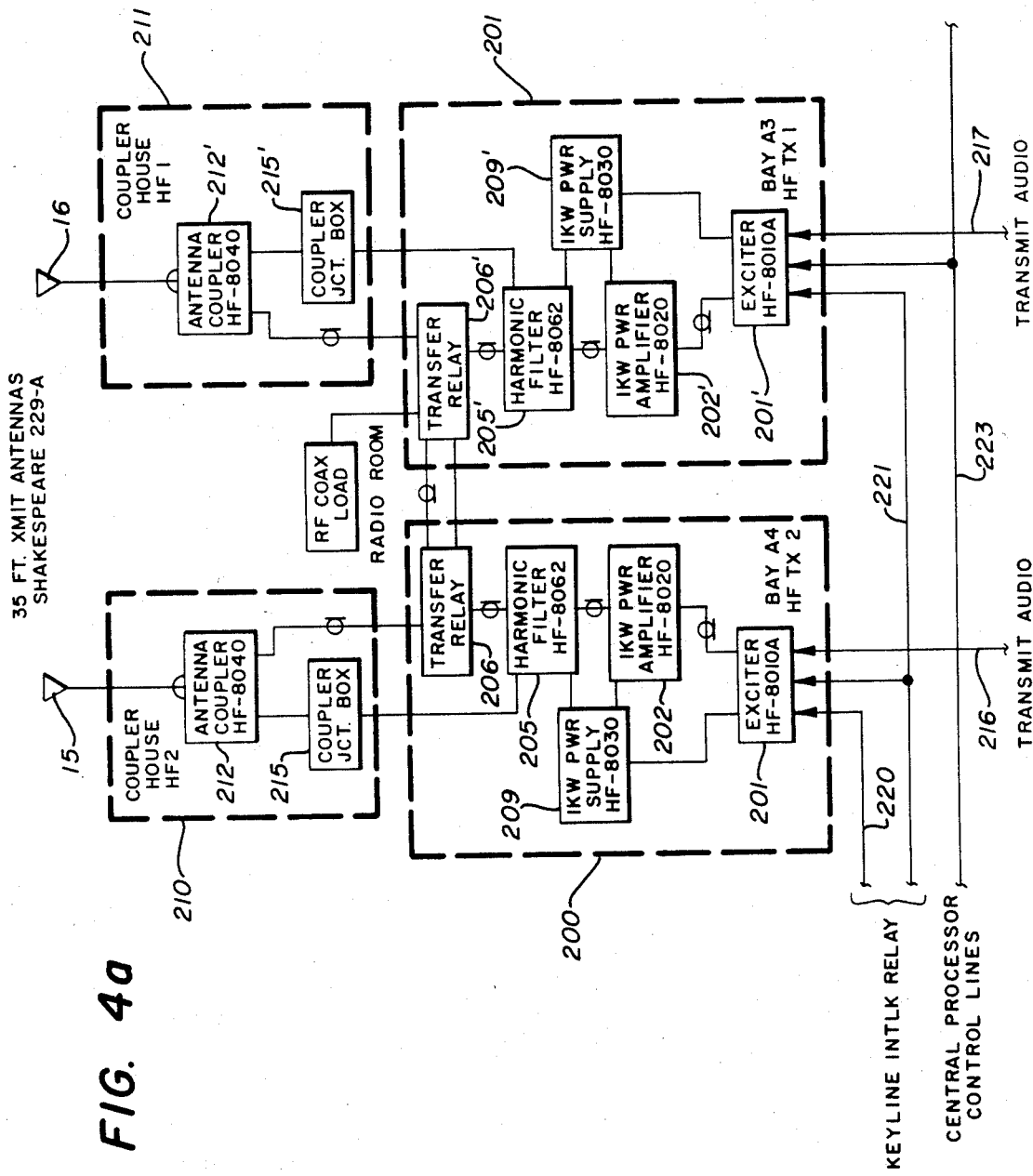
FIGS. 4a and 4b are box diagrams of the HF transmitter and receiver portions of the system of FIGS. 1, 2 and 3 in accordance with the invention, in greater detail.
Figure 4B:
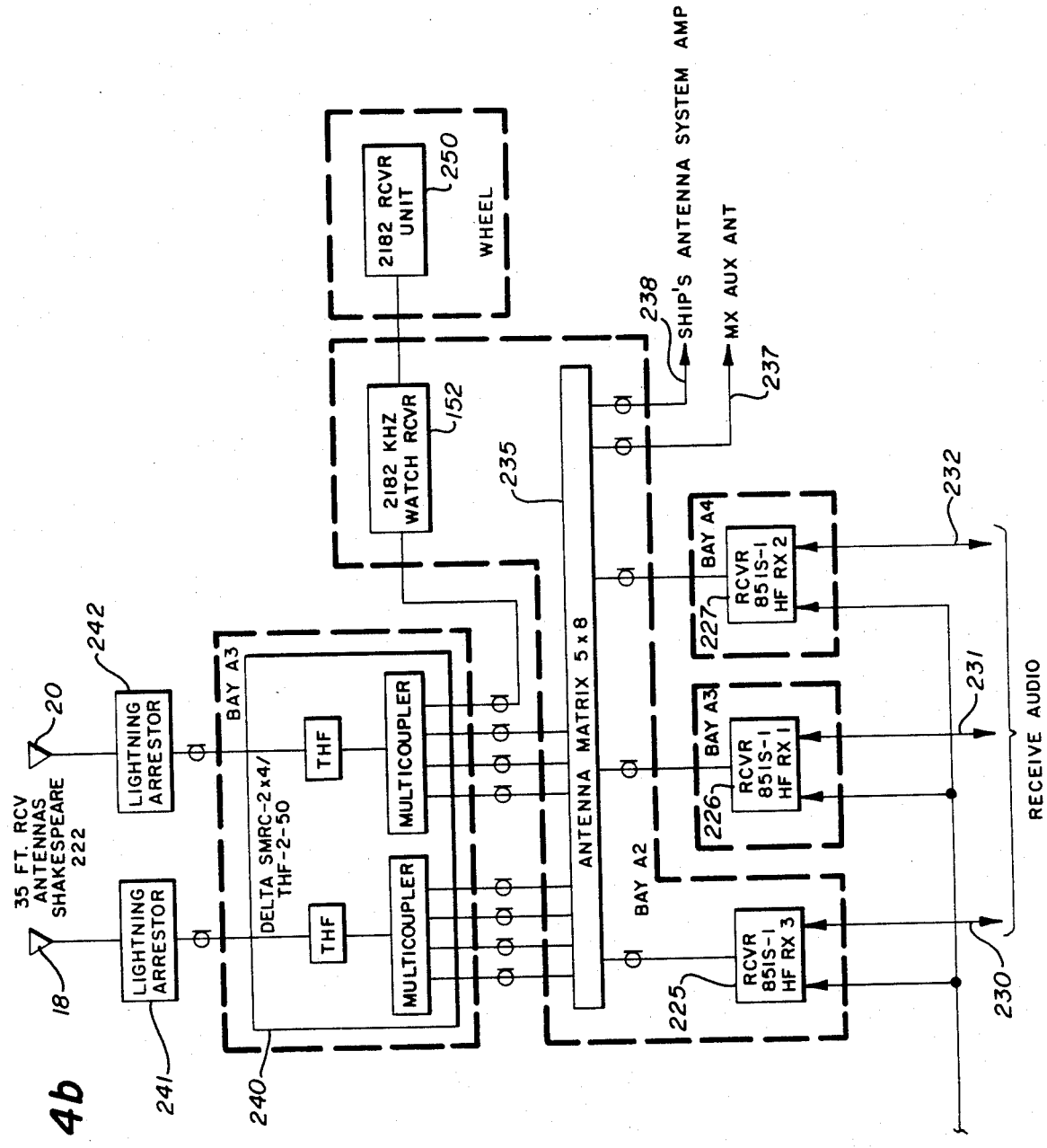

The high frequency transmitters and receivers are shown in greater detail in FIGS. 4a and 4b. The two high frequency transmitters indicated within the box 150 in FIG. 3 are designated by respective reference numerals 200 and 201. Each contains the same equipment and, for brevity, the respective parts of each are indicated by the same reference numeral with corresponding parts being indicated by a reference numeral and the numeral followed by a prime ('). The transmitter 200 includes an exciter 201, a one kilowatt amplifier 202, a harmonic filter 205, and a transfer relay 206. The unit is powered by a one kilowatt power supply 209. The operation of high frequency transmitters being well known in the art, is not described in detail herein. The output from the transmitter 200 is connected to coupler house 210 within which an antenna coupler 212 connects the output from the transmitter section 200 to the antenna 15. In like fashion, the output of transmitter 201 is coupled to the transmitter antenna 16. Additionally, within the coupler houses 210 and 211 are coupler junction boxes 215 and 215' which interconnect the harmonic filters 205 and 205' with the antenna couplers 212 and 212'.

The exciter of the transmitter receives the audio to be transmitted from input lines 216 and 217. In addition, the exciters 201 and 201' are connected to a key line interlock relay (not shown) by lines 220 and 221, respectively. The exciters 201 and 201' are controlled by the central processing unit 110 (see FIG. 3) on control line 223, all as below described.

The receiver sections of the high frequency system include three high frequency receivers 225, 226, and 227, each of which is also controlled by the central processor 110 (see FIG. 3) by control signals on the line 223. The receivers 225-227 produce audio outputs on respective audio lines 230, 231, and 232 connected to an antenna matrix 235, which, incidentally, produces outputs to an MX auxiliary antenna on line 237 and to a ships antenna system amplifier (not shown) on line 238. The input to the antenna matrix is derived from a multicoupler section 240 which is connected via lightning arrestors 241 and 242 to respective high frequency receiver antennas 18 and 20. Additionally connected to one of the multicouplers of the multicoupler unit 240 is the 2182 kilohertz watch receiver 152 and a 2182 kilohertz receiver remote unit 250 which may be located, for example, at a remote location such as the ship's wheel house.

Figure 5A:
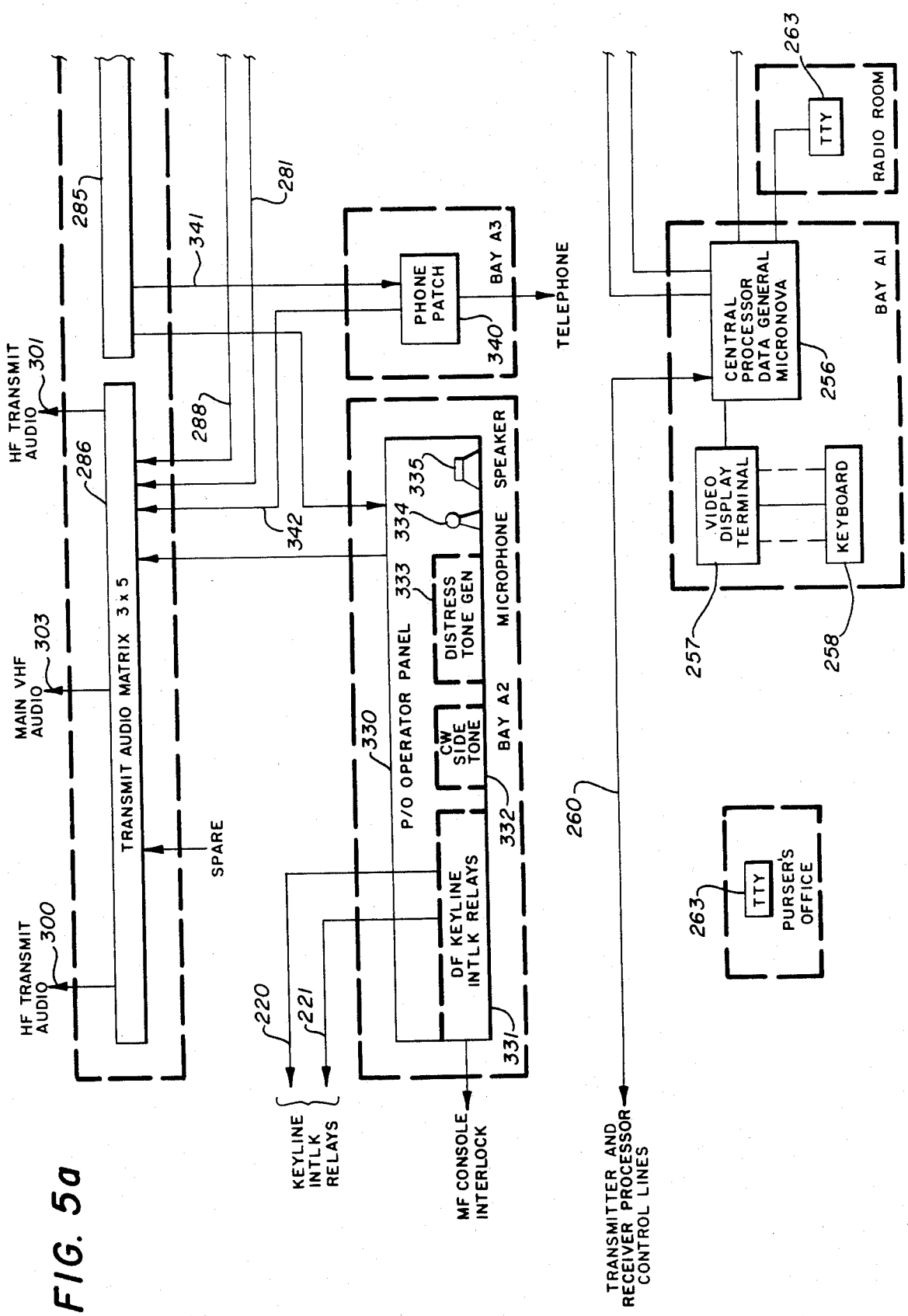
FIGS. 5a and 5b are box diagrams of the audio and control systems of the system of FIGS. 1, 2, and 3, in accordance with the invention, in greater detail.
Figure 5B:
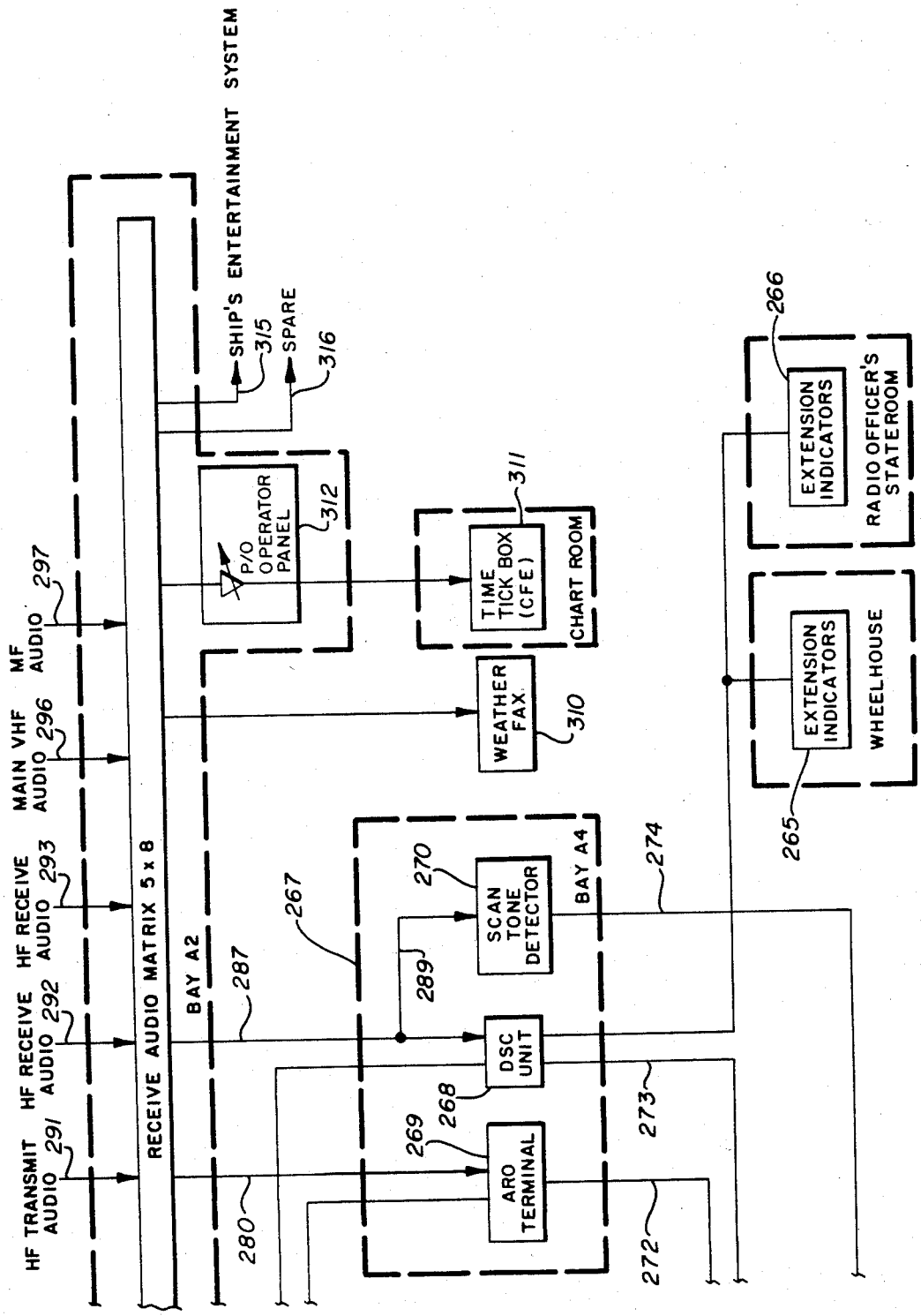

The voice, data and control systems are shown in block diagram form in FIGS. 5a and 5b, by which the telecommunications system of the invention can be controlled. The overall system is controlled by a central processor unit 256 which can be, for example, any properly programmed digital computer, such as the digital computer sold by Data General Corporation under their trademark "Micronova". A video display terminal 257 and data entry keyboard 258 are provided for operator interface with the central processor unit 256. The various transmitter and receivers of the telecommunications system of the invention are controlled by the central processor 256, via control line 260 which are provided for this purpose. Thus, the various frequencies of the various selected receivers or transmitter can be selected in accordance with predefined selection criteria entered into the central processor unit 256, to be controlled as needed. Additionally connected to the central processing unit 256 is one or more teletypewriter units 262 and 263 (connections not shown) which may be located at various locations, such as the radio room or the purser's office, or other locations, as desired. The central processing unit 256 also controls various extension indicators of the telecommunication system, such as the extension indicators 264 and 265, indicated to be in the wheel house and radio officer's stateroom, respectively. In addition to the foregoing, the central processor unit 256 controls the digital selective calling (DSELCALL) system, indicated generally by the reference numeral 267, and which contains a DSELCALL unit 268, an ARQ terminal 269, and a scan tone detector 270, via control lines 272, 273, and 274, respectively.

The DSELCALL unit 268 is connected to the central processing unit 256, and to the extension indicators 265 and 266, for example, in the wheel house and radio officer's stateroom, respectively, as shown. The ARQ terminal is connected by lines 280 and 281 respectively to the received audio matrix 285 and to the transmit audio matrix 286. In like fashion, the DSELCALL unit 268 is connected by lines 287 and 288 respectively to the received audio matrix 285 and transmit audio matrix 286. The line 287 between the DSELCALL unit 268 and the receive audio matrix 285 is connected by line 289 to an input of the scan tone detector 270. Thus, the scan tone detector 270 can scan the received audio tones received on the audio matrix 285 concurrently with the reception of data received by the DSELCALL unit 268 from the selected HF receive radio via the audio matrix 285. The receive audio matrix 285 receives audio from all of the various radio audio sources, including the HF received audio on lines 291, 292, and 293, audio from the main VHF receiver on line 296, and the audio from the medium frequency receiver on line 297. The transmit audio matrix 286, in a similar fashion, delivers audio to the HF transmitter on lines 300 and 301, and to the main VHF radio on line 303.

Additional connections can be made to the receive audio matrix 285, for example, by the inclusion of a weather facsimile device 310, a time tick box 311 (for example via an operator panel 312). In addition, the ships entertainment system can receive audio from the medium frequency receiver on line 315, and, if desired, a spare output line 316 can be provided.

The overall control for the system can be established in an operator control panel 330 which may include various interlock relays 331, CW side tone generators 332, distress tone generators 333, a microphone 334 and speaker 335. Finally, a phone patch 340 may be included, if desired, and connected to the receiver audio matrix 285 and transmit audio matrix 285 and transmit audio matrix 286 by lines 341 and 342, respectively.

As mentioned, the entire telecommunications system 40 (see FIG. 2) is configurable by the central processor unit 256 (see FIG. 5a). Thus, the operator, by entering the appropriate commands in the keyboard 258 can instruct the central processor unit 256 to configure the system in any manner in which the particular operator chooses. An example, of such selection can be to associate one of the HF radio transmitters, such as the transmitter 200 (see FIG. 4) with the ARQ terminal 269, and the other transmitter 201 with the DSELCALL unit 268. The operator may also optionally associate one of the receivers, such as the receiver 255, with the ARQ terminal 269 and another receiver, for example receiver 226, with the DSELCALL unit 268 and the scan tone detector 270. Other assignments, may of course be made within the discretion of the radio operator. With the assignments made as above described, under the control of the central processor 256, the DSELCALL and scan tone detector can be automatically operated in accordance with a predetermined computer program under which the central processor unit operates.

Figure 6B:
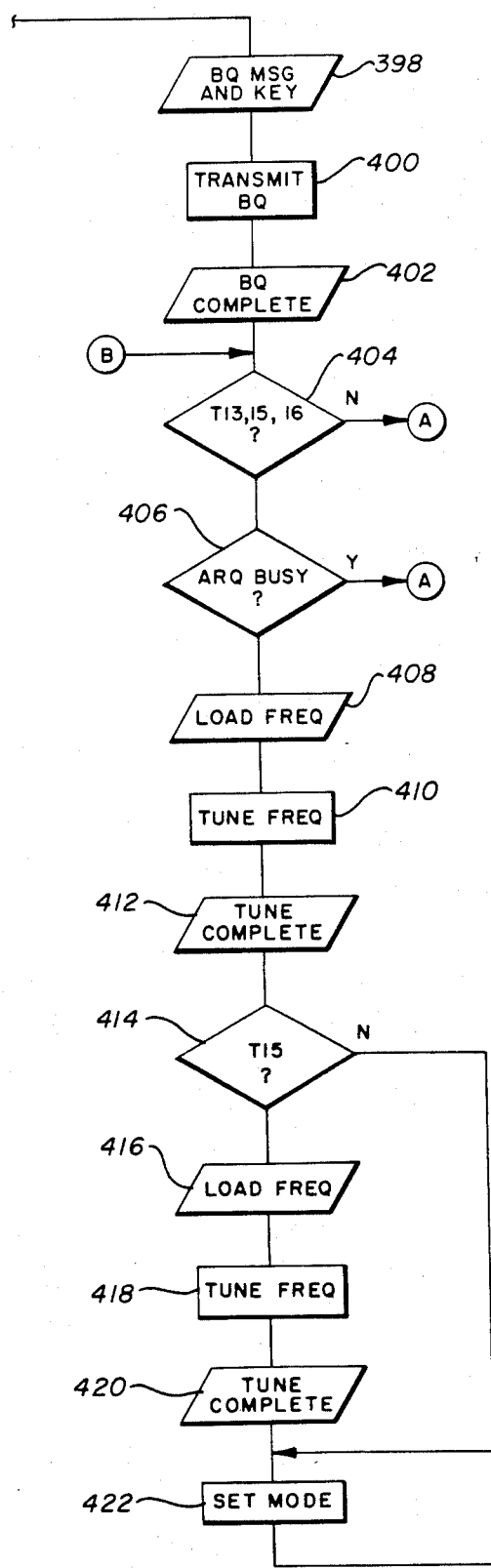
Figure 6B:
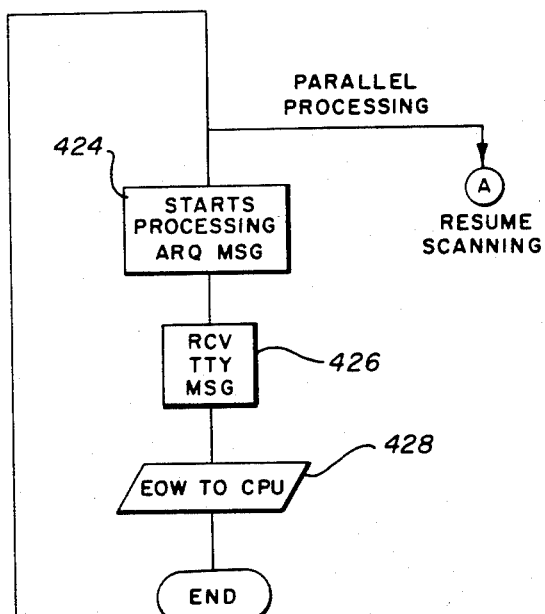

A preferred embodiment of such computer program is shown in flow chart form in FIGS. 6a and 6b. The DSELCALL unit and system are first initialized, as indicated by boxes 350, 351, and 352 in which the DSELCALL unit is associated with an appropriate high frequency receiver and transmitter, and in which the various preset values to be detected are placed within the DSELCALL unit. The scanning routine is then begun at 354 and operates to cause the DSELCALL unit to scan all of the preselected DSELCALL frequencies, as will become apparent. The scanning routine causes the first frequency to be scanned to be loaded into the DSELCALL unit 268, box 356. The associated HF receiver is then tuned to the selected receive frequency, box 358. If the scan tone detector 270 (see FIG. 5b) does not detect the appropriate DSELCALL tones, the loop is repeated beginning at point "A", at which time the next preselected DSEL- CALL frequency is loaded. The receiver is then retuned to the new frequency, and the presence or absence of DSELCALL tones is again determined, diamond 360. If the tone detector 270 detects the appropriate DSELCALL tones, with reference to FIG. 5b, a bit transition, or other signal, is sent on line 274 to the central processor unit 256 to lock the central processing unit 276 into DSELCALL unit 268 from further scanning, parallelogram 362. The tone detector lock is also sent to the DSELCALL, and on the high to low transition of the tone detector lock the DSELCALL relay closes. The closure of the scan relay is then inputted to the central processor unit. If the scan relay thereafter opens, the central processing unit resumes scanning, as will be described below. The scan process is repeated through all of the preselected DSELCALL frequencies and repeated continuously, unless a signal to be received is detected as mentioned, in which case, the signal is processed, as described below, and after which the scan routine is reinitiated.

When a signal is detected by the presence of tones, as described, and after the DSELCALL and scanner is locked onto the frequency on which tones were detected, a check is made for "dots", diamond 364. The "dots" test begins 3.2 seconds after the tone detector lock is sent. If "dots" are not received within 3.2 seconds, the scanning relay is opened and the central processing unit resumes the scanning process, beginning at point A on the flow diagram. It should be noted that 3.2 seconds is selected as a period during which the occurrance of a properly received DSELCALL signal must occur. Thus, if the "dots" are not received within that time, it is assumed that the signal received is not a proper DSELCALL signal, and, therefore, may be ignored. If "dots" are detected, the address portion of the received DSELCALL signal is decoded, box 366, and, a determination is made whether the received signal is addressed to the receiving ship, diamond 368. If not, the scanning process is resumed from point "A" in the routine. If the decoded address indicates the signal is for the particular ship with which the ship is associated, the message is then received and decoded, box 369. The decoded message is compared against messages previously received and stored in memory, box 371, and if not identical to a message already in memory, decision diamond 370, it is stored in memory for recall or retransmission, as desired, box 371. The stored message is addressed on line "C" by a recall requirement decision, diamond 377 and box 378. The decoded message received is then sent on lines 273 from the DSELCALL unit 268 to the central processing unit 256, parallelogram 372, and the CPU outputs the message received to an appropriate display, parallelogram 374 and box 376. It should be noted that the display can be any display selected, such as the teletypewriter if a hard copy is required, or, alternatively, on the video display unit, or both. Additionally, at this point, if desired remote indicators 265 at various locations within the ship can be turned on to indicate to monitoring personnel the reception of a DSELCALL message.

At this juncture, a determination is made whether the incoming message includes a request to send additional radio traffic to the receiving ship, diamond 379. If so, the routine for acknowledging the received signal is skipped, jumping to input point "B" in the routine for receiving the traffic, to be described below. If there is no additional traffic requirement, the DSELCALL signal is acknowledged. A check is first made of the system configuration, box 380, during which a check is made whether transmitter #1 or transmitter #2 is associated with the DSELCALL unit. If neither transmitter has been assigned to the DSELCALL function, the routine is ended, and the scanning process is returned to point "A" in the routine, diamond 382. If one of the transmitters has been assigned to the DSELCALL unit, the transmit address is loaded in the central processing unit, parallelogram 384, and control signals sent to the transmitter, box 386. The transmit frequency is then loaded by the CPU into the transmitter, parallelogram 388, and the transmitter tuned to the assigned frequency, box 390. When the tuning is complete, a signal is transmitted to the central processing unit, parallelogram 392. The DSELCALL unit then composes the acknowledgment message to be sent, box 394, and the message is then sent under the control of the central processing unit to the transmitter, parallelogram 396. The message is then transmitted, parallelogram 398 and box 400, and, upon the completion of the message transmission, the routine is continued, parallelogram 402.

It should be noted that in the repeat request determination and system configuration steps, diamond 379 and box 380, if the incoming message has a repeat request which is not a distress call (a distress call is automatically repeated, even though a repeat request is not received as a part of the message), the DSELCALL unit sends an ASCII "del" character to the CPU. The CPU tunes the assigned transmitter to the paired oscillator frequency and the DSELCALL keeps the scan relay closed during the transmission process. At this point, no additional incoming messages can be received until the CPU responds.

Looking again at the scanning and DSELCALL process within the CPU 256, beginning at point "B" in the routine, the CPU checks at this point for telecommands "T13", "T15", and "T16", diamond 404. If one of these telecommands is found, an ASCII "DC1" character is sent to the CPU before the receive frequency and a "DC2" character is sent before transmit frequency. The CPU will then tune the transmitter if one is assigned. The telecommands "T13, T15, and T16" indicate respectively the telecommunications mode and frequency, as is known in the art. T13, for example, indicates a receive mode on frequency F1, in teletypewrite mode and FEC operation. T15 indicates transceive mode on frequency F1 in teletypewrite mode for ARQ operations. T16 indicates a receive mode on F1, in teletypewrite mode. Thus, the "T13", "T15", and "T16" indicate the ARQ channel which should be used for the automatic error repeat function presently to be described.

Once the frequency or channel has been determined, if the number or channel detected is found not to be one of those used for the ARQ function, the process is terminated and the scanning routine resumed beginning at point "A" in the scanning routine. On the other hand, if one of the transmit frequencies is found, a determination is then made whether the ARQ unit or terminal 269 is busy, diamond 406. If it is busy, again the scanning process is resumed at point "A" in the program. If the ARQ unit is not busy, the appropriate indicated ARQ frequency is loaded in the CPU, parallelogram 408, the ARQ receivers are tuned to the assigned frequency, box 410, and the completion of the tuning process is indicated to the CPU, box 412. The CPU then checks only for the assignment of channel T15, diamond 414, and if not found, jumps to a lower point in the routine to be described. If channel T15 is found, the transmit frequency is loaded in the CPU, box 416 and the transmitter associated with the ARQ unit is tuned to that frequency, box 418. When the tuning is complete, the transmitter indicates the completion to the CPU, parallelogram 420. The ARQ mode is then set to a standby mode, box 422. The standby mode allows the ARQ and the selective FEC messages to be received. At this point, a parallel mode of operation of the system begins in which the system is permitted to resume the scanning at point "A" in the overall process. Concurrently, the ARQ message is processed by being sent and received, boxes 424 and 426, in the usual ARQ fashion. Upon the completion of the ARQ process, an end of work signal is sent to the CPU, parallelogram 428.

It can thus be seen that with the system including the central processing unit programmed in accordance with the flow chart above described, that automatic DSELCALL and ARQ operation can be achieved without a requirement for human intervention other than presetting or initializing the system with the assigned radio and transmitter pairs to the appropriate ARQ and DSELCALL units and inputting the desired operational frequencies into the DSELCALL scanner. It can also be seen that one of the primary advantages of the system as described is that during periods of adverse telecommunications environments that the data reception or message reception is automatically handled. That is, if a incoming message is detected but due to interference of various natures is unable to be totally properly received, the message will automatically not be acknowledged to provide to the transmitting station an indication requiring retransmission of the message at a later time.

It should be appreciated that although the process has been described as being applicable to messages received by the ship from such as a shore or remote location, it is equally applicable to messages originating on the ship itself. Such messages, for instances can be automatically generated messages at for transmission at predetermined times. For example, in some cases it may be desirable to transmit, say every six hours, a message from the ship to another location containing a report of the remaining fuel on board, or updated position reports, or the like. In such cases, the message is automatically generated, then placed in a queue in memory, effected by box 371 with an indication that a message is awaiting transmission, diamond 370. The message is then transmitted in its turn, in the same fashion as described above with respect to the retransmission of a message received from a shore or remote location.

Although the invention has been described and illustrated with a certain degree of particularity, it is understood that the present disclosure has been made by way of example only and that numerous changes in the combination or arrangement of parts may be resorted to by those skilled in the art without departing from the spirit and scope of the invention as hereinafter claimed.

We claim:

1. A radio system for automated shipboard operation comprising:
   a plurality of HF radio receivers;
   a plurality of HF radio transmitters;
   an automatic error request (ARQ) unit with which one of said receivers and one of said transmitters is associated;
   a digital selective calling (DSELCALL) unit with which another of said receivers and another of said transmitters is associated;
   means, including a digital computer to (1) scan the receiver associated with said DSELCALL unit among preselected DSELCALL frequencies, (2) to associate said one receiver and one transmitter with said ARQ unit in accordance with a message received by said DSELCALL assigned receiver and decoded by said DSELCALL unit, and (3) to initiate a DSELCALL ready signal for transmission by the transmitter associated with said DSELCALL unit.

2. A radio system for automated shipboard operation, comprising:
   a plurality of radio receivers;
   a plurality of radio transmitters;
   an automatic error request (ARQ) unit with which one of said receivers and one of said transmitters is associated;
   a digital selective calling (DSELCALL) unit with which another of said receivers and another of said transmitters is associated;
   a video display terminal (VDT) unit upon which radio information and messages can be displayed upon reception and composed for transmission;
   means automatically responsive to control instructions entered into said VDT for selectively associating said receivers and transmitters with said DSELCALL unit and said ARQ unit in accordance with said control instructions, scanning said receiver associated with said DSELCALL unit among preselected DSELCALL frequencies, and controlling said transmitter associated with said DSELCALL unit in accordance with the frequency of said scanned receiver, and controlling the operation of said receivers and transmitters associated with said ARQ unit, as needed.

3. The system of claim 2 wherein said automatically responsive means controls the operation of all of said plurality of recievers and transmitters.

4. The system of claim 2 further comprising message printing means controlled by said automatically responsive means to provide a copy of selected messages received by at least one of said receivers.

5. The system of claim 2 wherein said plurality of receivers are three in number and said plurality of transmitters are two in number.

6. In a shipboard system of radio communications equipment, the improvement comprising apparatus associated with said system enabling messages to be addressed to the ship with which the radio communications system is associated, said enabling apparatus including means for automatically decoding the messages addressed at least to the ship with which the system is associated, and for providing at least the messages themselves, means for automatically interconnecting said radio communications equipment in response to a first set of the messages provided, means for automatically generating and transmitting acknowledgement signals in response to a second set of the messages provided, and means, responsive to a third set of messages provided, to transmit at least a portion of each of the essages provided.

7. A shipboard radio telecommunications system comprising:
   a first HF radio receiver and transmitter;
   a second HF radio receiver and transmitter;

an automatic error request (ARQ) unit within which said first HF radio receiver and transmitter are associated;

a digital selective calling (DSELCALL) unit with which said second HF radio receiver and transmitter are associated;

means, including a digital computer, to control the frequencies of said first and second radio transmitters and receivers and said ARQ and DSELCALL units, and to operate the DSELCALL unit to:

scan a plurality of predefined DSELCALL frequencies;

discontinue the scan upon reception by said DSELCALL associated receiver of tones on one of the scanned frequencies;

determine the presence of "dots" on the frequency:

decode the address on the signal received;

determine whether the signal is intended for the ship with which the telecommunications system is associated;

decode the message;

and acknowledging the receipt of the message.

8. The shipboard radio telecommunication system of claim 7 wherein said means, including said digital computer further includes means to tune the receiver and transmitter associated with the ARQ unit to frequencies specified in the received signal and operate the ARQ unit to receive the signal transmitted.

9. The shipboard radio telecommunication system of claim 8 wherein said means, including said digital computer further includes means to:

renew the scanning routine upon the completion of traffic reception.

* * * * *